Nov. 14, 1933.      A. Y. DODGE      1,935,393
BRAKE
Filed May 22, 1930      2 Sheets-Sheet 1

INVENTOR.
Adiel Y. Dodge
BY  M. W. McConkey
ATTORNEY

Nov. 14, 1933.  A. Y. DODGE  1,935,393
BRAKE
Filed May 22, 1930   2 Sheets-Sheet 2

INVENTOR.
Adiel Y. Dodge
BY
R. W. McConkey
ATTORNEY

Patented Nov. 14, 1933

1,935,393

UNITED STATES PATENT OFFICE 1,935,393

BRAKE

Adiel Y. Dodge, South Bend, Ind., assignor to Bendix Brake Company, South Bend, Ind., a corporation of Illinois Application May 22, 1930. Serial No. 454,584

2 Claims. (Cl. 188—218)

This invention relates to brakes and more particularly to means for preventing the building up of audible vibrations therein.

It is well established that there are three prime factors which are the direct cause of audible vibrations in a brake drum. These are: Deformation of the brake drum due to heat and other causes, a non-uniform radius and changes in the coefficient of friction caused by various foreign elements, such as moisture, water, sand, mud and heat. Each of these factors will cause vibrations which frequently build up to an audible pitch and become exceedingly objectionable and annoying. The present invention aims to overcome these objections.

This invention contemplates a small mass of weight associated with a brake drum and having a movement relative thereto, this relative movement to be taken up by a frictional connection between the drum and the mass to dissipate a portion of the energy represented in the wave vibrations of the drum by means of the frictional engagement therewith.

An object of the invention is to dissipate the energy which is represented in the audible vibrations of a brake drum.

Further objects and advantages of the invention reside in the various combinations hereinafter described and claimed, as will be apparent upon reference to the following specification and the accompanying drawings, in which:

Figure 1:
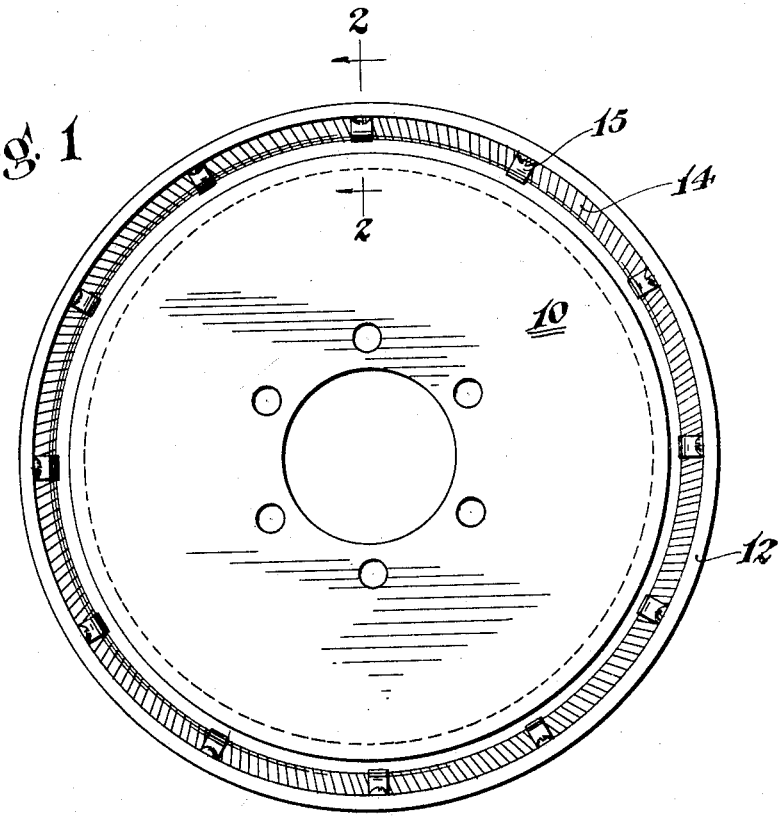
Figure 1 is a side elevation of a brake drum embodying the invention.
Figure 2:
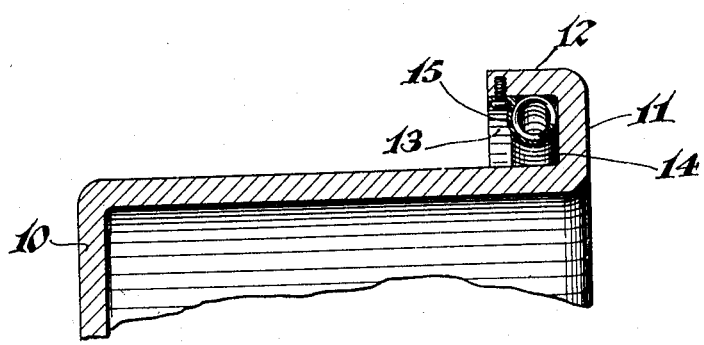
Figure 2 is a sectional view substantially on line 2—2, Figure 1.
Figure 3:
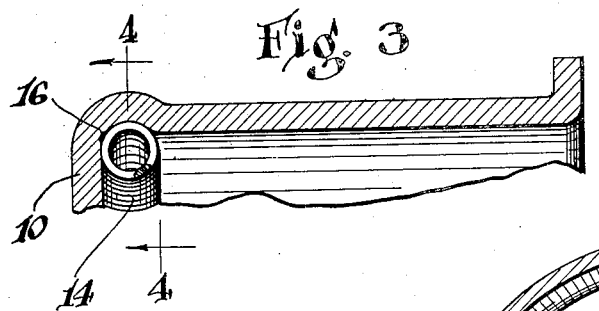
Figure 3 is a fragmentary cross sectional view of a brake drum embodying a modification of the invention.
Figure 4:
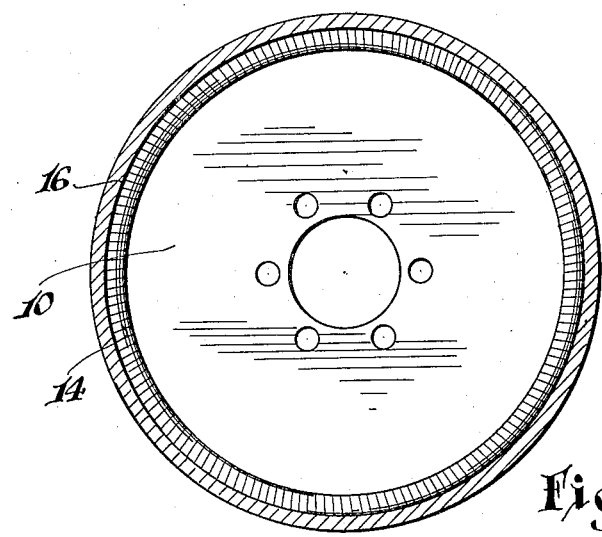
Figure 4 is a vertical sectional view substantially on line 4—4, Figure 3.

Referring to the drawings for more specific details of the invention, 10 represents a brake drum of the conventional type having a flange 11 provided with a portion bent back as indicated at 12 parallel to the periphery of the drum to form a housing 14. Positioned in the housing is a coil spring 14 held against displacement by straps 15. The spring is in compression and bears against the inner side of the flange portion 12. It has a natural tendency to be set in motion relative to vibrations that may be built up in the brake drum and is connected to the brake drum by means of relatively light friction, so that the vibrating drum and shoes associated therewith will have movements relative to the center of the mass of weight or springs.

This relative movement is taken up by the frictional connection between the spring and the brake drum which will dissipate a portion of the energy represented in the wave vibrations of the drum and shoe associated therewith.

It is to be observed that the relation between the drum and the spring is such that due to centrifugal force, the spring will not be displaced, but on the contrary will be held more securely in frictional engagement with the drum.

Figure 5:
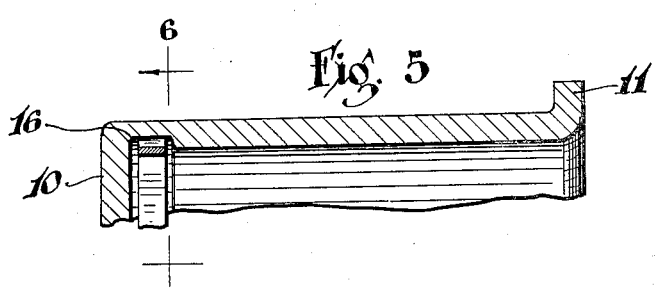
Figure 5 is a cross sectional view of a brake drum illustrating a further modification.
Figure 6:
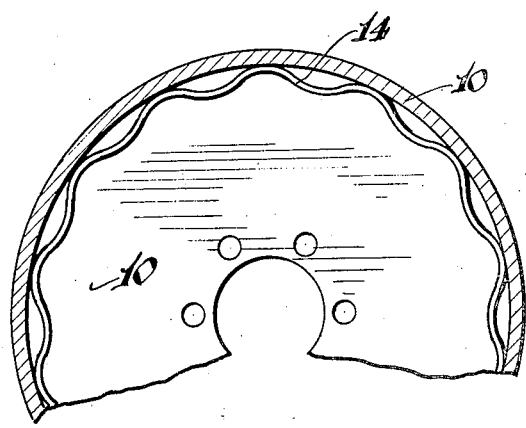
Figure 6 is a vertical sectional view substantially on line 6—6, Figure 5.

In Figures 3, 4, 5 and 6, I have illustrated modified forms of the invention, wherein the drum is provided with a circumferential groove 16 in which a spring 14 is positioned, the spring being in compression. In Figures 5 and 6 the spring 14 is a flat metallic spring of wavy or sine-wave configuration and contacts with the drum at spaced points. As shown, the groove 16 is formed in the flange on the inner wall thereof, adjacent to the disks, so that any possibility of displacement is avoided.

In these particular embodiments, the connection between the drum and the spring is such that there is a relatively light friction between these two elments and, as in the principal embodiment of the invention, the relative movement being taken up by the frictional connection, it results in dissipation of a portion of the energy represented in the wave vibrations of the drum and will hence dissipate the energy represented in the audible vibrations.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising an annular member subject to vibration when the brake is applied, and a flat spring of wavy configuration contacting with an interior surface of the annular member and held in longitudinal compression thereby.

2. A brake comprising a brake drum, an annular compression spring of wavy configuration engaging an interior surface of the drum to reduce audible vibration of the drum, and means associated with the drum for maintaining the spring in operative position.

ADIEL Y. DODGE.